(12) United States Patent
Keidar et al.

(10) Patent No.: US 8,875,485 B2
(45) Date of Patent: Nov. 4, 2014

(54) MICRO-CATHODE THRUSTER AND A METHOD OF INCREASING THRUST OUTPUT FOR A MICRO-CATHODE THRUSTER

(75) Inventors: Michael Keidar, Baltimore, MD (US);
Alexey Shashurin, Arlington, VA (US);
Taisen Zhuang, Arlington, VA (US)

(73) Assignee: The George Washington University, Washington, DC (US)

( * ) Notice: Subject to any disclaimer, the term of this patent is extended or adjusted under 35 U.S.C. 154(b) by 882 days.

(21) Appl. No.: 13/081,106

(22) Filed: Apr. 6, 2011

(65) Prior Publication Data

US 2011/0258981 A1 Oct. 27, 2011

Related U.S. Application Data

(60) Provisional application No. 61/341,887, filed on Apr. 6, 2010.

(51) Int. Cl.
*F03H 1/00* (2006.01)
*H05H 1/02* (2006.01)
*H05H 1/10* (2006.01)
*H05H 1/50* (2006.01)
*B64G 1/40* (2006.01)

(52) U.S. Cl.
CPC ............. *B64G 1/405* (2013.01); *H05H 1/50* (2013.01); *F03H 1/0087* (2013.01)
USPC ............................. 60/202; 60/203.1; 60/204

(58) Field of Classification Search
USPC ............ 60/202, 203.1, 200.1, 204; 313/359.1
See application file for complete search history.

(56) References Cited

U.S. PATENT DOCUMENTS

| | | | | |
|---|---|---|---|---|
| 3,309,873 | A * | 3/1967 | Cann | 60/203.1 |
| 4,577,461 | A * | 3/1986 | Cann | 60/203.1 |
| 5,319,926 | A * | 6/1994 | Steenborg | 60/203.1 |
| 6,818,853 | B1 | 11/2004 | Schein et al. | |
| 7,518,085 | B1 | 4/2009 | Krishnan | |
| 2007/0045248 | A1* | 3/2007 | Schein et al. | 219/121.52 |
| 2009/0229240 | A1* | 9/2009 | Goodfellow | 60/202 |

OTHER PUBLICATIONS

Polk et al., "A Theoretical Analysis of Vacuum Arc Thruster Performance," presented at the 27th International Electric Propulsion Conference, Pasadena, CA, Oct. 15, 2001, published by the Electric Rocket Propulsion Society, pp. 1-20.

Keidar, M. et al., "Magnetically enhanced vacuum arc thruster," Plasma Sources Sci. Technol. (2005), vol. 14, pp. 661-669.

(Continued)

*Primary Examiner* — Andrew Nguyen
(74) *Attorney, Agent, or Firm* — Panitch Schwarze Belisario & Nadel LLP

(57) ABSTRACT

A magnetically enhanced micro-cathode thruster assembly for providing long-lasting thrust is provided. The micro-cathode thruster assembly includes a tubular housing, a tubular cathode, an insulator, an anode and a magnetic field. The tubular housing includes an open distal end. The tubular cathode is housed within the housing and includes a distal end positioned proximate the open distal end of the housing. The insulator is in contact with the cathode forming an external cathode-insulator interface. The anode is housed within the housing, proximate the open distal end of the housing. The magnetic field is positioned at or about the external cathode-insulator interface and has magnetic field lines with an incidence angle of about 0 to about 90 degrees and preferably about 4 to about 30 degrees relative to the external cathode-insulator interface.

25 Claims, 12 Drawing Sheets

(56) References Cited

OTHER PUBLICATIONS

Schein, J. et al., "Inductive energy storage driven vacuum arc thruster," American Institute of Physics, (2002), vol. 73, No. 2, pp. 925-927.

Zhuang, T., et al., "Development of Micro-Vacuum Arc Thruster with Extended Lifetime," The 31st International Electric Propulsion Conference, University of Michigan (2009), pp. 1-9.

Zhuang, T., et al., "Circular periodic motion of plasma produced by a small-scale vacuum arc," Plasma Sources Science and Technology, 20 (2011), pp. 1-4.

Zhuang, T., et al., "Micro-Vacuum Arc Thruster with Extended Lifetime," Joint Propulsion Conference & Exhibit, (2009),12 pages.

Zhuang, T. et al., "Performance characterization of the micro-Cathode Arc Thruster and propulsion system for space applications," Joint Propulsion Conference & Exhibit, vol. 46, No. AIAA-2010-7018, (2010), pp. 1-8.

* cited by examiner

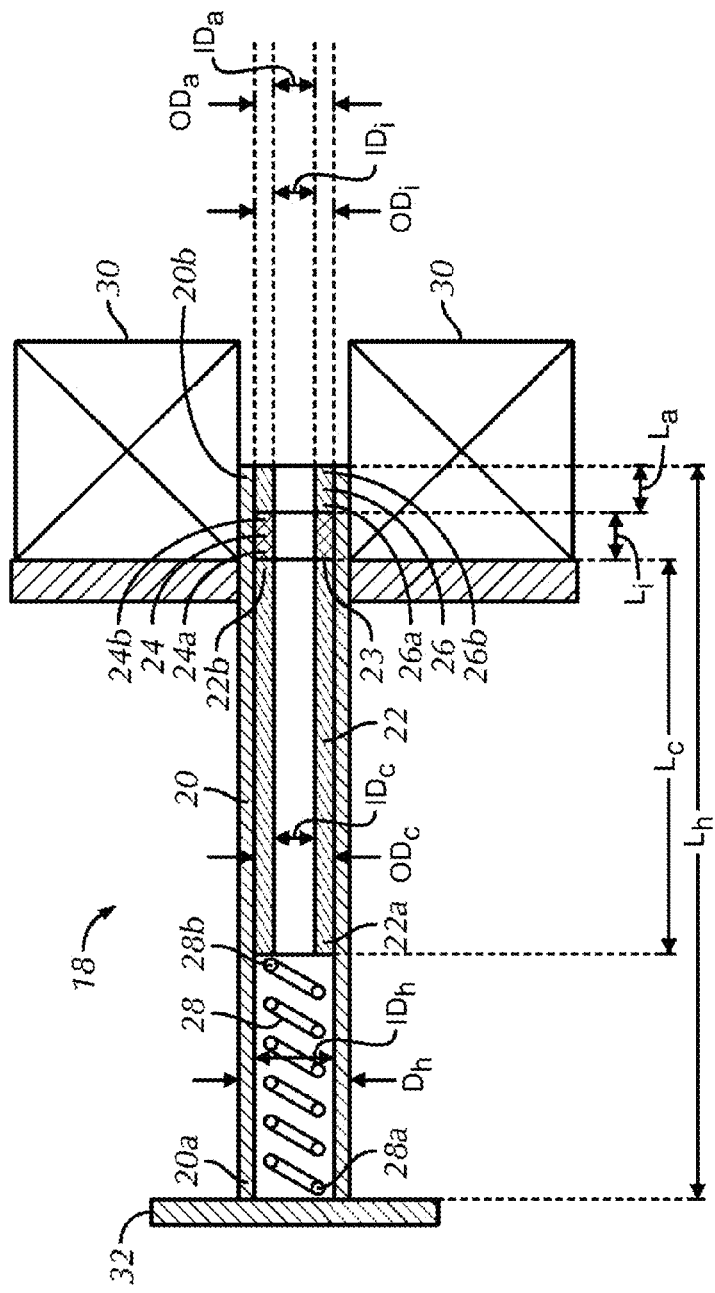
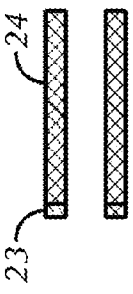
FIG. 2
FIG. 2A

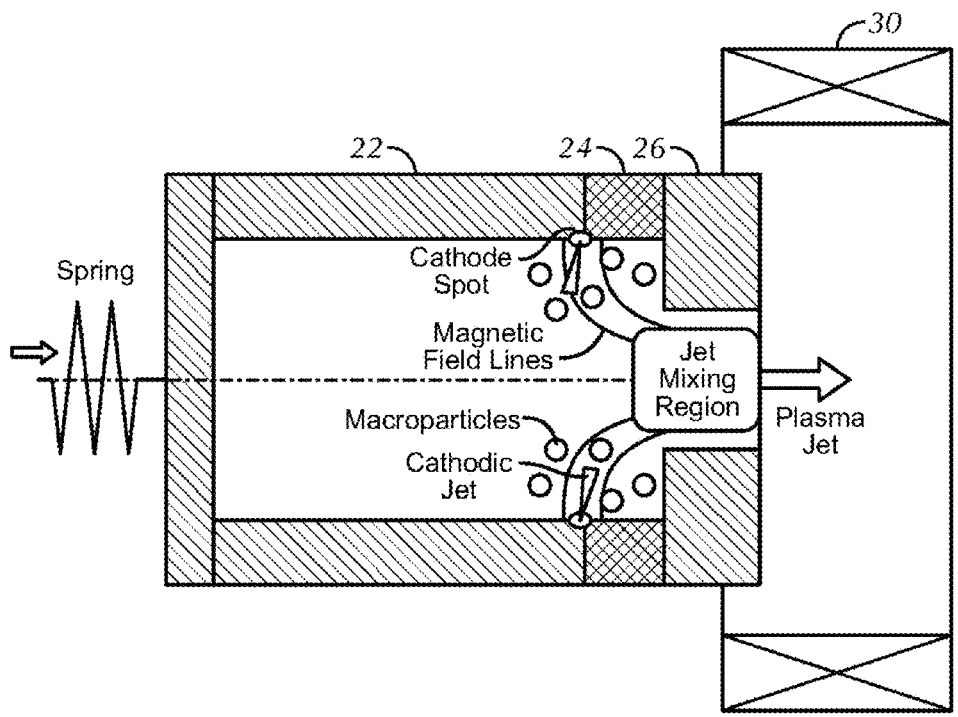
*FIG. 8*
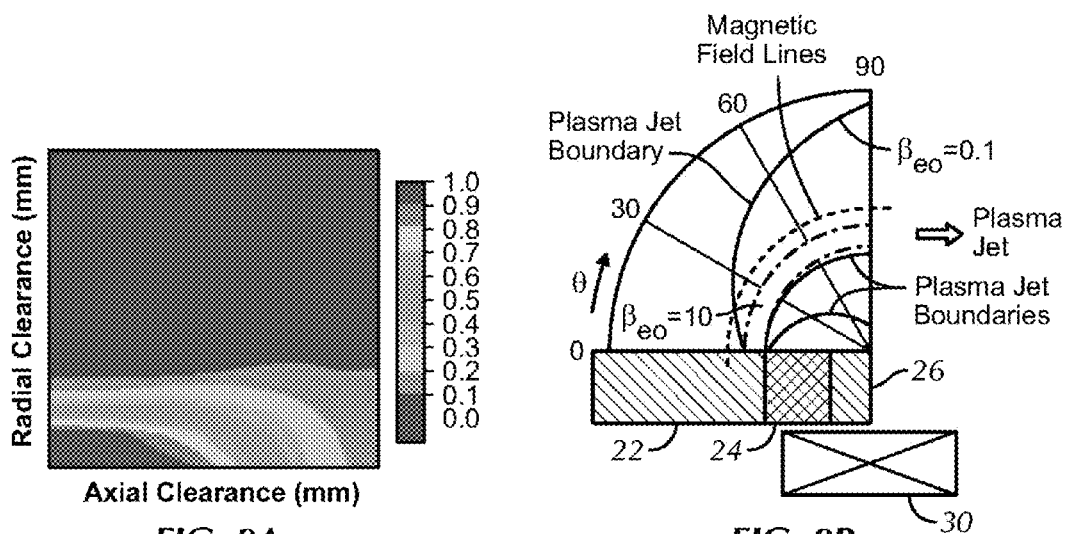
*FIG. 8A*  *FIG. 8B*

MICRO-CATHODE THRUSTER AND A METHOD OF INCREASING THRUST OUTPUT FOR A MICRO-CATHODE THRUSTER

CROSS-REFERENCE TO RELATED APPLICATION

This application claims the benefit under 35 U.S.C. §119 (e) of U.S. Provisional Patent Application No. 61/341,887, filed Apr. 6, 2010, the disclosure of which is hereby incorporated herein by reference in its entirety.

BACKGROUND OF THE INVENTION

The present invention relates to a vacuum arc thruster. In particular, the present invention relates to a magnetically enhanced micro-cathode thruster (MCT).

A vacuum arc thruster (VAT) provides thrust capabilities for low mass objects, such as micro and nano satellites in orbit around the earth or elsewhere in space. A typical VAT has a cathode that also serves as the solid fuel source and propellant for the VAT. The thrust created by the VAT is dominated by pressure gradients formed by expanding plasma generated by a low voltage energy source. However, the efficiency and life of conventional VATs are considerably low and therefore limit the applications suitable for VATs.

Thus, there is still a need for a low mass VAT that is capable of providing improved thrust performance in long life applications. Such a need is satisfied by the present invention.

BRIEF SUMMARY OF THE INVENTION

One aspect of the present invention relates to a magnetically enhanced cathode thruster assembly that includes a tubular housing, a tubular cathode, an insulator, an anode and a magnetic field. The tubular housing includes an open distal end. The tubular cathode is housed within the housing and includes a distal end positioned proximate the open distal end of the housing. The insulator is in contact with the cathode forming an external cathode-insulator interface. The anode is housed within the housing, proximate the open distal end of the housing. The magnetic field has magnetic filed lines positioned at the external cathode-insulator interface at an incidence angle of about 0 to about 90 degrees relative to the external cathode-insulator interface.

Another aspect of the present invention relates to a magnetically enhanced cathode thruster that includes a power unit and a thruster assembly. The power unit includes a voltage source, an inductor connected to the voltage source, and a switch connected to the voltage source and the inductor. The thruster assembly is connected to the power unit. The thruster assembly includes a tubular housing having an open distal end, a tubular cathode, an insulator, an anode and a magnetic field. The tubular cathode is housed within the housing and includes a distal end positioned proximate the open distal end of the housing. The insulator in contact with the cathode forming an external cathode-insulator interface. The anode is housed within the housing and proximate the open distal end of the housing. The magnetic field has magnetic field lines positioned about the external cathode-insulator interface at an incidence angle of about 0 to about 90 degrees relative to the external cathode-insulator interface. The power unit supplies power to the thruster assembly thereby producing plasma about the external cathode-insulator interface which is directed distally by the magnetic field.

In yet another aspect, the present invention relates to a method of enhancing the thrust-to-power ratio of a vacuum arc thruster that includes the steps of providing a vacuum arc thruster and providing a magnetic field. The vacuum arc thruster includes a tubular housing having an open distal end, a tubular cathode housed within the housing and having a distal end proximate the open distal end of the housing, an insulator in contact with the cathode forming an external cathode-insulator interface, and an anode housed within the housing and proximate the open distal end of the housing. The magnetic field is positioned about the external cathode-insulator interface and having magnetic field lines with an incidence angle of about 0 to about 90 degrees relative to the external cathode-insulator interface.

In another aspect, the present invention relates to a method of controlling thruster output of a vacuum arc thruster that includes the steps of providing a vacuum arc thruster, providing a magnetic field, and providing a controller. The vacuum arc thruster includes a tubular housing having an open distal end, a tubular cathode housed within the housing having a distal end proximate the open distal end of the housing, an insulator in contact with the cathode forming an external cathode-insulator interface, and an anode housed within the housing and proximate the open distal end of the housing. The magnetic field is positioned about the external cathode-insulator interface and having magnetic field lines with an incidence angle of about 0 to about 90 degrees relative to the external cathode-insulator interface. The controller controls the magnetic field strength of the magnetic field.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 is a side cross-sectional elevational view of a MCT assembly in accordance with a preferred embodiment of the present invention;

FIG. 2a is a side cross-sectional elevational view of an insulator of the MCT of FIG. 2;

FIG. 8 is a partial cross-sectional schematic representation of the MCT of FIG. 2 and the calculated plasma jet geometry during transport in a curved magnetic field;

FIG. 8A illustrates the plasma density distribution of a plasma plume discharged from the MCT of FIG. 8;

FIG. 8B is a partial schematic representation of the plasma jet boundary of the MCT of FIG. 8;

DETAILED DESCRIPTION OF THE INVENTION

Figure 1:
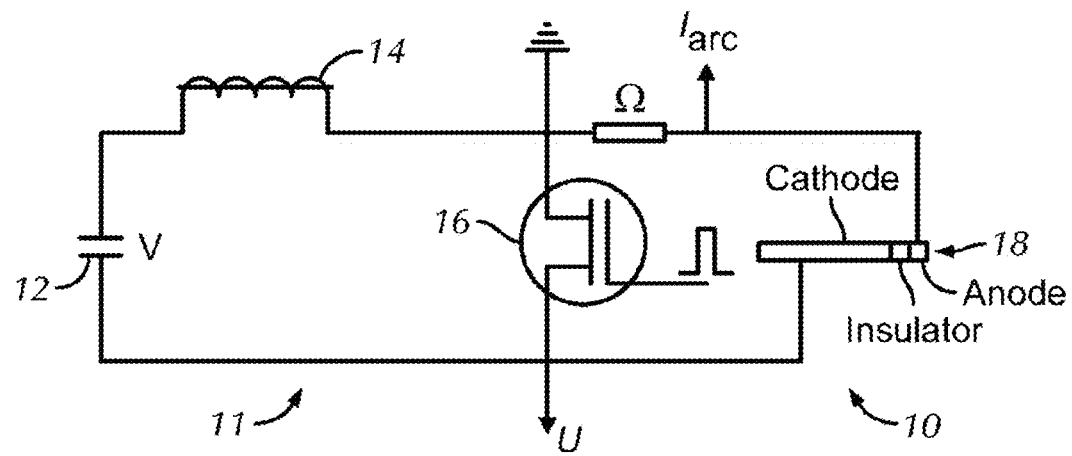
FIG. 1 is a partial schematic diagram of a MCT in accordance with a preferred embodiment of the present invention including a circuit diagram of an embodiment of a power processing unit for use with various embodiments of the magnetically enhanced cathode thruster assembly of the present invention.

Certain terminology is used in the following description for convenience only and is not limiting. The words "right," "left," "upper," and "lower" designate directions in the drawings to which reference is made. For purposes of convenience, "distal" is generally referred to as toward the exit plane, rear end or discharge end of the MCT, and "proximal" is generally referred to as toward the base of the housing, front end, or closed end of the thruster assembly. The terminology includes the words specifically mentioned above, derivatives thereof, and words of similar import.

Figure 14:
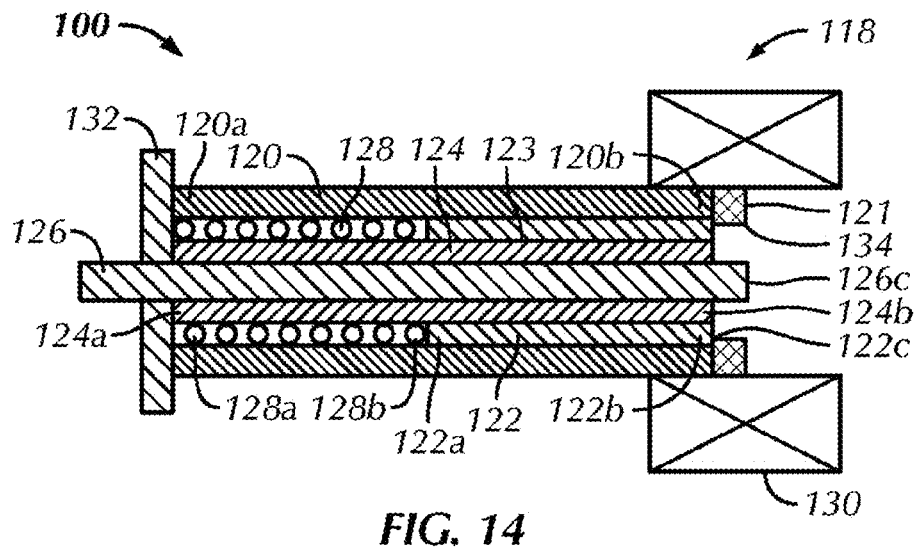
FIG. 14 is a side cross-sectional elevational view of a MCT assembly in accordance with a another preferred embodiment of the present invention.
Figure 15:
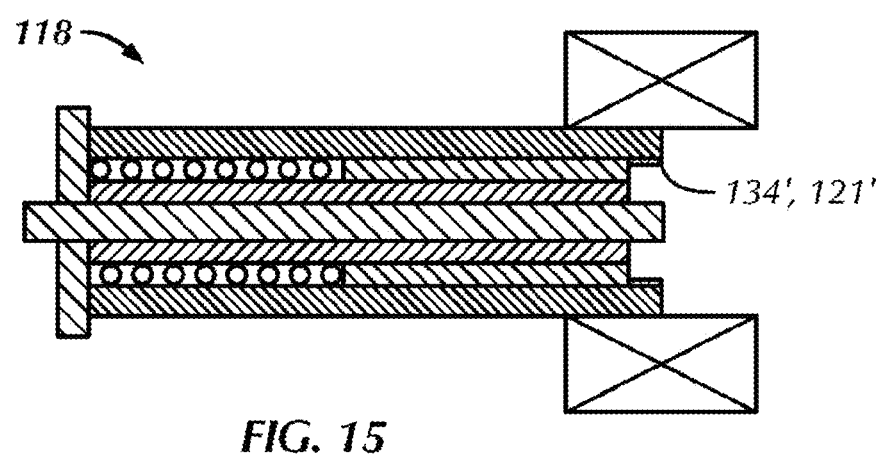
FIG. 15 is a side cross-sectional elevational view of a MCT assembly in accordance with yet another preferred embodiment of the present invention.

In a first preferred embodiment, the present invention relates to a magnetically enhanced MCT thruster 10 of the type shown in FIGS. 1 and 2, that includes a power processing unit ("PPU") 11 connected to a MCT assembly 18. FIG. 1 also illustrates an exemplary circuit diagram of the PPU that is operatively connected to the MCT assembly 18 (schematically shown in FIG. 1). FIGS. 2, 14 and 15 illustrate alternative embodiments of the MCT assembly applicable to the present invention.

The PPU 11 includes a voltage source 12, such as a battery, a solar photovoltaic cell or cells, or the like, an energy storage inductor 14, and a switch 16, (e.g., a solid state switch). The voltage source 12 is connected to the inductor and provides current to the inductor 14 when the switch 16 is enabled. The switch 16 is connected to the voltage source and the inductor, as shown in FIG. 1. The current in the inductor 14 increases until the switch 16 opens. Upon the switch 16 opening, the output voltage in the MCT assembly 18 increases until it achieves an arc initiation potential and an arc develops in the MCT assembly 18 between a cathode 22 and an anode 26 (FIG. 2).

The energy storage inductor 14 can be any inductor known in the art and suitable for the described intended use. For example, the energy storage inductor 14 can be an iron or ferrite core inductor, an air core inductor, or a magnetic inductor.

The voltage source 12, energy storage inductor 14 and switch 16 are components known to those of ordinary skill in the art and thus, a detailed description of them is not necessary for a complete understanding of the present invention. For example, the operation and structure of such components are also described in U.S. Pat. No. 6,818,853, the disclosure of which is hereby incorporated herein by reference in its entirety.

One embodiment of a MCT assembly 18 is configured as shown in FIG. 2, and includes a body in the form of a tubular housing 20, a tubular cathode 22, a tubular or annular insulator 24, a tubular or annular anode 26, a biasing member 28 and a magnet 30. As used herein the term "tubular" refers to having the form of or consisting of a tube, such as but not limited to tubes having any cross-sectional profile e.g., a circle, square, rectangle, triangle, trapezoid, parallelogram and the like. The tubular housing 20 is preferably configured as a circular tubular housing and formed from an insulator material such as, but not limited to, alumina silicate, alumina, polytetrafluoroethylene (PTFE) and the like.

The tubular housing 20 includes a base 32 about the tubular housing's proximal end to cap the proximal end. The base 32 can be formed integral and unitarily with the tubular housing 20 or as a separate component attached to the tubular housing 20. The tubular housing 20 has a length $L_h$ and a diameter $D_h$. The length $L_h$ and diameter $D_h$ of the tubular housing 20 will vary depending on the specific application, however, the tubular housing 20 is preferably an elongated housing having a length $L_h$ significantly greater than the diameter $D_h$. The tubular housing 20 includes a proximal end 20a and an open discharge or open distal end 20b that is proximate the MCT's exit plane. The exit plane is defined as a plane, region or surface of the MCT assembly 18 associated with the point of origin of the MCT's cathode spots or plasma plume.

The cathode 22 is of a tubular configuration and sized to be housed within the tubular housing 20. That is, the overall outside diameter $OD_c$ of the cathode 22 is slightly smaller than the overall inside diameter $ID_h$ of the tubular housing 20, such that the cathode 22 resides within the housing 20 and slides along the axial length of the housing 20. The cathode 22 is also preferably configured to have a length $L_c$ that is less than the length $L_h$ of the housing 20 and to have an overall inside diameter $ID_c$ that is about 60% to about 90% of the cathode's outside diameter $OD_c$. Preferably, the wall thickness of the cathode 22 is about 0.1 mm to about 1.0 mm.

The cathode 22 being a tubular cathode has an open proximal end 22a and an open distal end 22b. The open distal end 22b is positioned proximate the open distal end of the housing 20, as shown in FIG. 2.

The cathode 22 can be formed from a conducting material. Preferably the conducting material is carbon, aluminum, titanium, chromium, iron, yttrium, molybdenum, tantalum, tungsten, lead, or bismuth. More preferably, the conducting material is titanium, molybdenum or tungsten.

The insulator 24 is positioned between the cathode 22 and the anode 26 and configured to have a tubular or annular ring configuration, as shown in FIG. 2. The tubular insulator is preferably sized to have a similar inside diameter $ID_i$ and outside diameter $OD_i$ as that of the cathode 22. However, the tubular insulator 24 is configured to have a relatively short length L. The length $L_i$ can be about 15% to about 35% of the outside diameter $OD_i$ of the insulator 24. Preferably, the insulator 24 is about 1 mm to about 2 mm in length. The function of the tubular insulator 24 is to provide an insulating barrier between the cathode 22 and anode 26, thus the length $L_i$ need only be as long as necessary to provide such an insulating barrier and will vary depending upon the insulating material used. The insulator 24 being of a tubular configuration has an open proximal end 24a and an open distal end 24b, as shown in FIG. 2.

The tubular insulator 24 can be formed from any insulating material such as, but not limited to, alumina silicate and alumina. Preferably, the surface of the tubular insulator 24 has a non-polished, surface roughness to facilitate adhesion of a conductive thin film coating 23.

The conductive thin film coating 23 enables discharge initiation at low applied voltages of about several hundred volts. The conductive thin film 23 can be comprised of a metal or carbon. The conductive thin film 23 is preferably less than 1 micron thick and more preferably about 0.1 micron to about 1 micron thick, so that the resistance of the conductive thin film 23 between the anode 26 and the cathode 22 is about 1 to about 40 kΩ. It is the high electric field produced between the cathode 22 and anode 26 that causes breakdown of the conductive thin film 23. This breakdown causes porosity or small gaps along the insulator 24 in the conducting area such that micro-plasmas are generated. These micro-plasmas expand into the surrounding space and allow current to flow directly from the cathode 22 to the anode 26 by forming a low resistance plasma discharge path about 0.01 ohm to about 0.1 ohm lower than an initial conductive thin film surface discharge path.

The anode 26 is configured with an inside diameter $ID_a$ and an outside diameter $OD_a$ similar to that of the cathode 26, but having a length $L_a$ significantly smaller than the cathode 22. Preferably, the anode 26 has a length $L_a$ that is about equal to the overall diameter $D_a$ of the anode 26 and more preferably a length $L_a$ less than the overall diameter $D_a$ of the anode 26. The anode 26 being of a tubular configuration has an open proximal end 26a and an open distal end 26b, as shown in FIG. 2.

The anode 26 can be formed from a conducting material. Preferably the conducting material is the same as that selected for the cathode 22. The conducting material for the cathode 22 can be carbon, aluminum, titanium, chromium, iron, yttrium, molybdenum, tantalum, tungsten, lead, or bismuth. More preferably, the conducting material is titanium, molybdenum or tungsten.

The biasing member 28 can be any biasing member sufficient to provide a force to advance or slide the cathode 22 within the housing 20 in the distal direction. For example, and not by way of limitation, the biasing member 28 can be a compression spring, a constant force spring, a torsional spring, and the like. Alternatively, the biasing member 28 can be an electromechanical actuator or the like for pushing or pulling or otherwise urging the cathode 22 within the housing 20 toward the discharge or distal end 20b, or toward the insulator 24.

The magnet 30 can be any magnet or device capable of producing a magnetic field, such as an electromagnet, a permanent magnet, a Halbach array magnet, or combinations thereof. The magnet 30 is preferably configured as a tubular or annular magnet 30 having an inside diameter $ID_m$ that is slightly larger than the outside diameter $OD_h$ of the housing 20. Preferably, the magnet 30 is configured to have or produce a magnetic field of about 0.1 tesla (T) to about 0.3 T.

The MCT assembly 18 is configured, as shown in FIG. 2, and will herein be described for illustrative purposes with a biasing member 28 having a compression spring configuration. The housing 20 houses the spring 28, the cathode 22, the insulator 24, and the anode 26. The spring 28 is housed within the housing 20 in a compressed state and has a proximal end 28a that engages the base 32 and an opposite distal end 28b that engages the cathode's proximal end 22a. The distal end 22b of the cathode 22 contacts the proximal end 24a of the insulator 24 forming an external cathode-insulator interface. In other words, a distally facing end of the cathode contacts a proximally facing end of the insulator thereby forming an interface between the cathode and the insulator. Further, with the overall internal and external dimensions of the cathode and insulator being substantially the same, as shown e.g., in FIG. 2, when the cathode interfaces with the insulator, it forms an external cathode-insulator interface. The term "external cathode-insulator interface" means an external surface formed by the abutment of a cathode surface and an insulator surface. Furthermore, the term "external cathode-insulator interface" encompasses any such surfaces open the environment, such as the internal surface of a hollow tube or the external surface of a hollow tube. Moreover, since the insulator has the conductive film 23, the conductive film can form the external cathode-insulator interface.

The insulator's distal end 24b contacts the anode's proximal end 26a. In other words, the insulator is in contact with a distally facing end of the cathode 22 and positioned between the cathode 22 and the anode 26. The anode's distal end 26b is preferably configured to be proximate or substantially flush with the housing's discharge or distal end 20b. The anode 26 is positioned distal to the cathode and the insulator and proximate the open distal end 20b of the housing.

The anode 26 is also secured to the distal end of the housing 20, such that the anode 26 cannot move distally relative to the housing 20. The anode 26 can be fixed in position within the housing 20 by any conventional fastener, adhesive, detent or an abutment. Alternatively, the housing 20 can be configured with a radially inwardly extending flange, such as flange portion 134 (FIG. 14) or 134' (FIG. 15), that prevents the anode 26 from sliding distally.

When in the assembled state, the overall combined lengths of the housing 20, anode 26, insulator 24 and spring 28 is such that the spring 28 is under compression. Thus, when the cathode 22 is also assembled to the MCT assembly 18, the spring 28 provides a force to the cathode 22 regardless of the overall length $L_c$ of the cathode 22 to urge the cathode 22 towards the discharge or distal end 20b of the housing 20. The appropriate sizing of the spring 28 is significant as the cathode 22 acts as the solid fuel for the MCT 10 that is used up during the life of the MCT 10. Thus, as the cathode 22 erodes, as further described below, the spring 28 maintains a sliding force to the cathode 22 such that the cathode 22 remains in contact with the insulator 24.

The positioning of the magnet 30, and consequently the magnetic field, is crucial to the overall performance and operation of the MCT 10. The magnet 30 is positioned about the exit plane of the MCT assembly 18 such that its magnetic field is present at the external cathode-insulator interface (i.e., point of origin of the plasma arc or cathode spot). Specifically, the magnetic field is positioned adjacent to or at least partially surrounding the external cathode-insulator interface such that the magnetic field is present at, at least part of the external cathode-insulator interface. This can be accomplished by positioning the magnet adjacent the external cathode-insulator interface such that its magnetic field lines are adjacent to, distal to and/or partially surrounding the external cathode-insulator interface or the open distal end of the housing.

Preferably, the magnet 30 is positioned to partially surround or within a couple of millimeters from the external cathode-insulator interface. More preferably, the magnet 30 is positioned about the distal end of the MCT assembly 18 such that the magnetic field has magnetic field lines having an incidence angle relative to the cathode spot (or the external cathode-insulator interface as shown in FIG. 2) of about 0 degrees to about 90 degrees, preferably about 4 degrees to about 30 degrees, more preferably about 20 degrees to about 30 degrees, and most preferably about 30 degrees at or about the external cathode-insulator interface. In other words, the applied magnetic field is positioned such that its magnetic field lines are about 0 to about 90 degrees, preferably about 4 degrees to about 30 degrees, more preferably about 20 degrees to about 30 degrees, and most preferably about 30 degrees relative to a longitudinal axis of the cathode and/or housing at or about the external cathode-insulator interface. The proper positioning of the magnet 30 to properly position the magnetic field at the above described incidence angle or magnetic angle, surprisingly provides for a significant increase in thruster performance of the MCT, as further described below. The magnet 30 can be fixed in position by various conventional fasteners, such as an adhesive, detent, screw and the like. Additionally, the magnetic field at the proper magnetic angle is applied having a magnetic field strength of about 0.1 T to about 0.3 T.

Figure 18B:
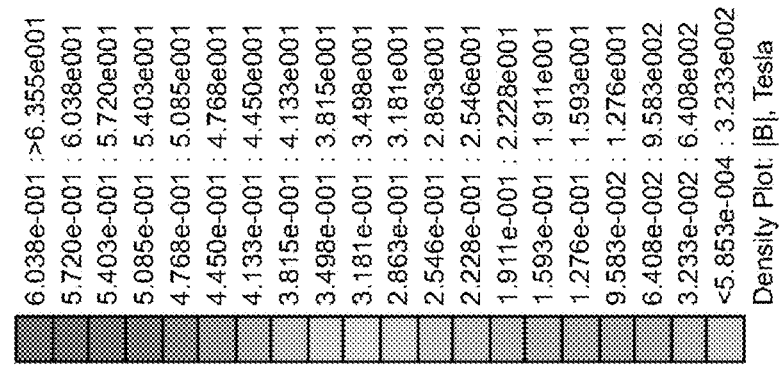
FIG. 18B is a magnetic field line distribution map of a MCT having an electromagnet positioned spaced apart and proximal to an external cathode-insulator interface of the MCT.
Figure 18B:
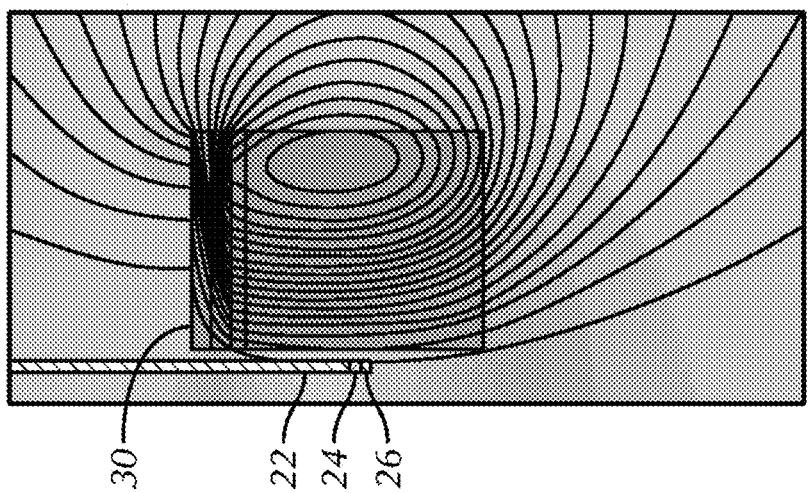
Figure 18A:
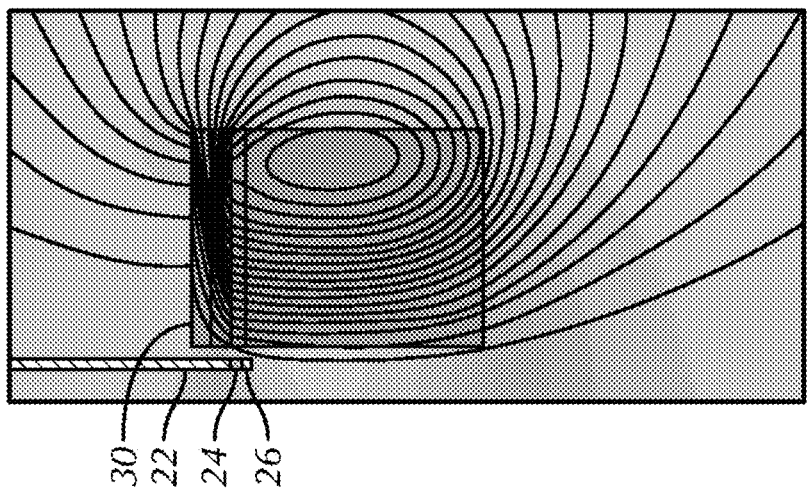
FIG. 18A is a magnetic field line distribution map of the MCT of FIG. 2 having an electromagnet.

FIGS. 18A and 18B illustrate the magnetic field lines at the external cathode-insulator interface as a result of positioning an electromagnet at various positions along the longitudinal axis of the MCT. Specifically, FIG. 18A illustrates that when an electromagnetic is positioned so that the magnetic core is adjacent to the external cathode-insulator interface and at an axial distance from the external cathode-insulator interface of about 0 inch, the magnetic field lines at the external cathode-insulator interface have an incidence angle relative to the external cathode-insulator interface. The incidence angle of the magnetic filed lines FIG. 18A is about 30 degrees relative to the external cathode-insulator interface. FIG. 18B illustrates that when an electromagnetic is positioned so that the magnetic core is spaced apart from the external cathode-insulator interface of about 0.5 inch in the axial direction the magnetic field lines at the external cathode-insulator interface are substantially parallel to the external cathode-insulator interface. FIGS. 18A and 18B also graphically illustrate the magnitude of the magnetic field strength at the external cathode-insulator interface.

Figure 17:
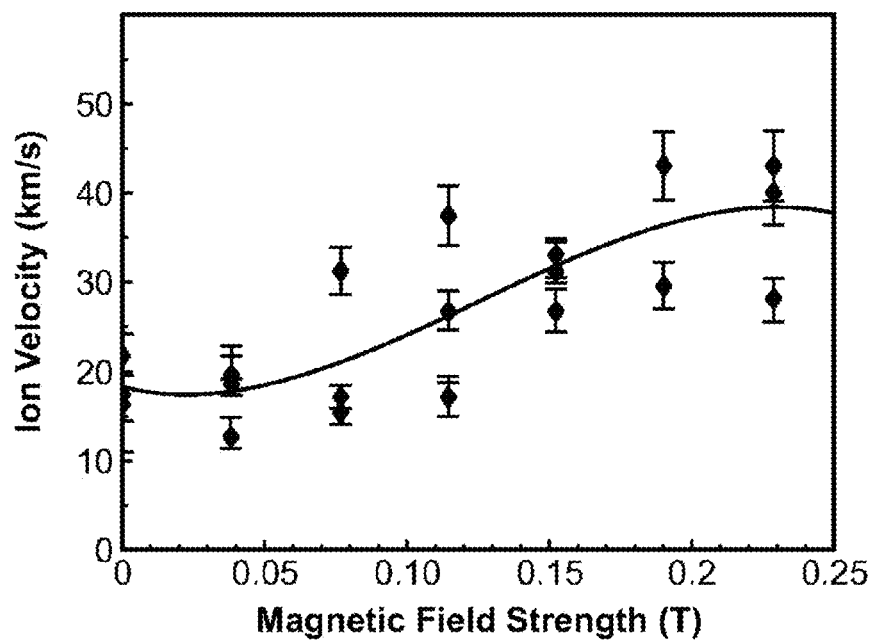
FIG. 17 is a graph of the ion velocity versus magnetic field strength of an MCT of the present invention.

Moreover, as illustrated in FIG. 17, the inventors of the present invention surprisingly discovered that applying a magnetic field to the MCT 10, as described above, allows for control of the amount of ion velocity based upon the magnetic field strength applied. That is, the amount of ion velocity of a MCT can be controlled, i.e., adjusted, based on the strength of the magnetic field applied when the magnetic field is applied at the external cathode-insulator interface at the appropriate magnetic incidence angle. This translates into a means of controlling thrust power for the MCT 10.

In operation, the MCT 10 is a simple, yet efficient electric propulsion device in the form of the MCT assembly 18 combined with an inductive energy storage PPU 11 that results in a low mass, e.g. less than 300 g, propulsion system. Propulsion is generated by plasma ignition that takes place close to the external cathode-insulator interface. That is, when the PPU supplies power to the MCT assembly, plasma is produced about the external cathode-insulator interface and directed distally by the applied magnetic field. The plasma ignition points are located along the entire external cathode-insulator interface. Plasma ignition leads to the erosion of the cathode electrode and, in the case of a conductive thin film on the insulator 24 surface, the plasma pulse provides re-deposition of the conductive thin film on the insulator 24. The basic mechanism underlying the MCT 10 is the production of micrometer-size fully ionized micro-plasmas i.e., cathode spots on the cathode's surface, which expand into vacuum at high velocities with the ions producing thrust. Every cathode spot carries a limited amount of current of about 1 A to about 10 A and exists for a few nanoseconds, which makes the MCT 10 scalable with respect to the pulsed operation and/or the amount of plasma produced.

The MCT 10 is a pulsed plasma thruster that uses conductive cathode materials as the propellant combined with an energy storage power processing unit that takes e.g., about 20 V to about 30 V from a bus, and converts it into an adequate power pulse for the MCT 10. It is a system well suited for providing small impulse bits (about 1 μNs) at high specific impulse $I_{sp}$ (i.e., velocity divided by the gravity constant g=9.8 m/s$^2$) of about 1,000 s to about 3,000 s. The specific impulse $I_{sp}$ represents the output velocity of ions from the MCT assembly 18. Thus, the MCT 10 can e.g., be applicable for addressing positioning and drag makeup for small, power and mass limited satellites.

The performance of the MCT 10 is determined by the propellant mass, the degree of ionization of the plasma, the angle of expansion, the average charge state and the ion velocity. Typical values for the ion velocity are about 10 to about 30 km s$^{-1}$, with an average $I_{jet}/I_{arc}$ current ratio on the order of 8% (i.e., 8:100). $I_{jet}$ current represents the output current of the MCT assembly 18, whereas the $I_{arc}$ current represents the current supplied by the PPU.

The MCT 10 is constructed using the energy storage inductor 14, circuit PPU and MCT assembly 18, as shown in FIGS. 1 and 2, in order to produce a low-mass system. In the PPU, the inductor 14 is charged via a semiconductor switch 16, such as an IGBT or MOSFET switch. When the switch 16 is opened, a voltage peak, L dI/dt, is produced, which breaks down the conductive thin film coated insulator 24 surface at relatively low voltage levels (e.g., about 200 V). The current flowing in the solid-state switch 16 (for ≤1 ms) is fully switched to the vacuum arc load prior to the breakdown of the conductive thin film. Typical currents of about 100 A (for about 100 μs to about 500 μs) are conducted with voltages of about 25 V to about 30 V. Consequently, most of the magnetic energy stored in the inductor 14 is deposited into the plasma pulse. By varying the length of a trigger signal, the level of the current in the switch 16, and thereby the energy stored in the inductor 14, can also be adjusted. This in turn changes the amount of energy transferred to the arc and the impulse bit of the individual pulse. The repetition rate of the individual pulse can be changed by varying the input signal as well.

The mass of the PPU can be configured to be small e.g., less than 300 g, resulting in a low-mass propulsion system. Thus, with a low-mass feed mechanism or biasing member, such as a spring 28, the MCT 10 can be used for an extended lifetime such as, up to 106 pulses per one 6 cm length cathode or about 100 days in continuous operation mode for a singe 6 cm length cathode. Longer lifetimes are capable with larger mass and/or length cathodes.

The magnetic field provided by the magnet 30 has two main functions. First, the configuration of the magnetic field keeps the arc spots at the boundary between the cathode 22 and insulator 24, i.e., at the external cathode-insulator interface. This occurs by effects of cathode spot drift towards the opening of acute angles formed by the magnetic field lines and cathode surface, the so called "acute angle rule." Multiple cathode spots are generated with a current per cathode spot of about 10 A to about 30 A depending on the cathode material. In addition, the magnetic field leads to cathode spot motion in the azimuthal direction, i.e., −JxB direction, thus causing uniform erosion of the cathode 22 from the distal face 22c of the cathode 22, i.e., the side facing the insulator 24. The spring 28 pushes the cathode 22 to the insulator 24 providing a long lifetime and stable operation of the MCT 10. The conductive thin film 23 deposited onto the insulator surface breaks down during the cathode 22 spot formation providing the necessary conditions for forming the cathode spot. Second, the magnetic field transforms radial cathodic plasma jet flow into axial flow.

In sum, the inventors of the instant invention have surprisingly found that applying a magnetic field of about 0.1 T to about 0.3 T at an incidence angle of about 0 to about 90 degrees, preferably about 4 degrees to about 30 degrees, more preferably about 20 degrees to about 30 degrees, and most preferably about 30 degrees relative to the external cathode-insulator interface of the MCT assembly 18 leads to improved thrust-to-power ratio by as much as a factor of fifty (50×). This is a significant improvement over conventional VATs.

By way of example and not by way of limitation, an example of a MCT 10 in accordance with the present invention will now be described, illustrating the significantly improved performance of the MCT 10 compared to conventional vacuum arc thrusters.

COMPARATIVE EXAMPLE I

Figure 16:
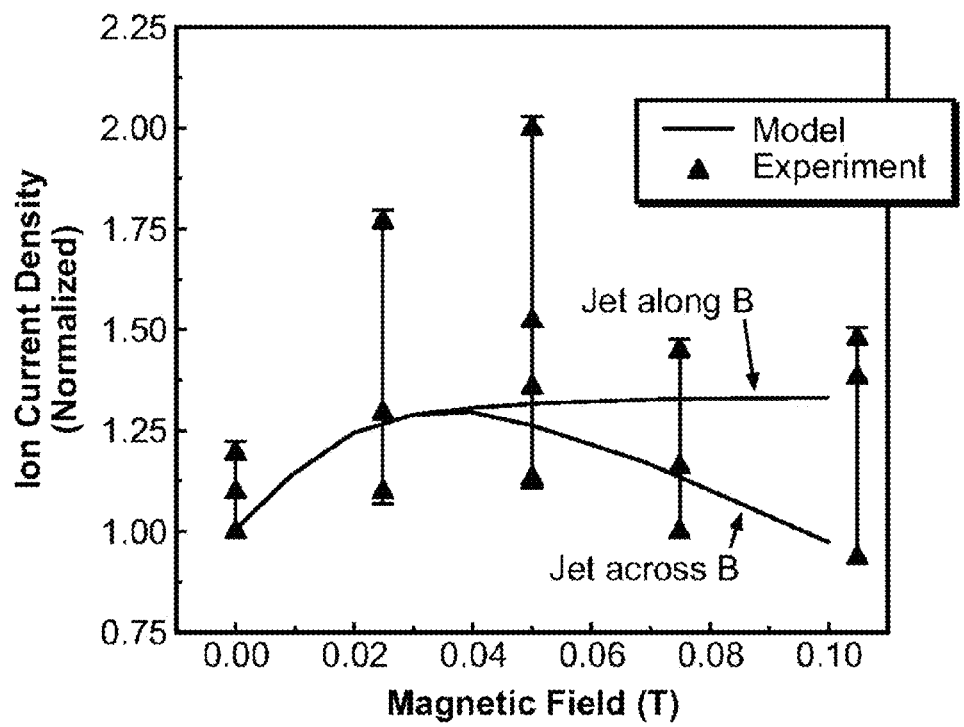
FIG. 16 is a graph of the ion current density dependence on the magnetic field for a conventional magnetically enhanced vacuum arc thruster compared to a simulated model prediction.

FIG. 16 illustrates the ion current density (at the exit plane) dependence on the magnetic field inside a conventional magnetically enhanced vacuum arc thruster ("MVAT") compared to a simulated model prediction. Details regarding the experimental results are discussed in Wilson K, Schein J, Gerhan A, Au M, Krishnan M, 2004 40$^{th}$ AIAA Joint Propulsion Conf. (Fort Lauderdale, Fla.) July 2004) AIAA paper AIAA 2004-3617 and "Magnetically Enhanced Vacuum Arc Thruster" Keidar et al., Plasma Sources Sc. Technolo. 14 (2005) 661-669, published Sep. 12, 2005, the disclosures of each are hereby incorporated by reference herein, in their entirety.

As shown in FIG. 16, the ion current density from a magnetic field of 0.0 to 0.10 increased from about 1.0 to about 1.3, thus representing a 1.3× increase in ion output current i.e., a performance parameter for the MVAT.

EXAMPLE I

Experimental Set Up and Diagnostics

A MCT assembly, as schematically shown in FIG. 2 for the MCT was used. The experiments were conducted in a vacuum chamber pumped down to a residual pressure of about $10^{-5}$ Torr. Two coaxial titanium arc electrodes were separated by a single insulator ring. The electrodes and insulator rings each had an outer diameter of 6.35 mm. Anode and insulator ring lengths were about 5 and 1 mm, respectively. The insulator was coated with a carbon paint (colloidal graphite in isopropanol) having a resistance on the order of 1-10 KΩ (before arcing). At these conditions breakdown occurs at about 100 V.

Figure 3:
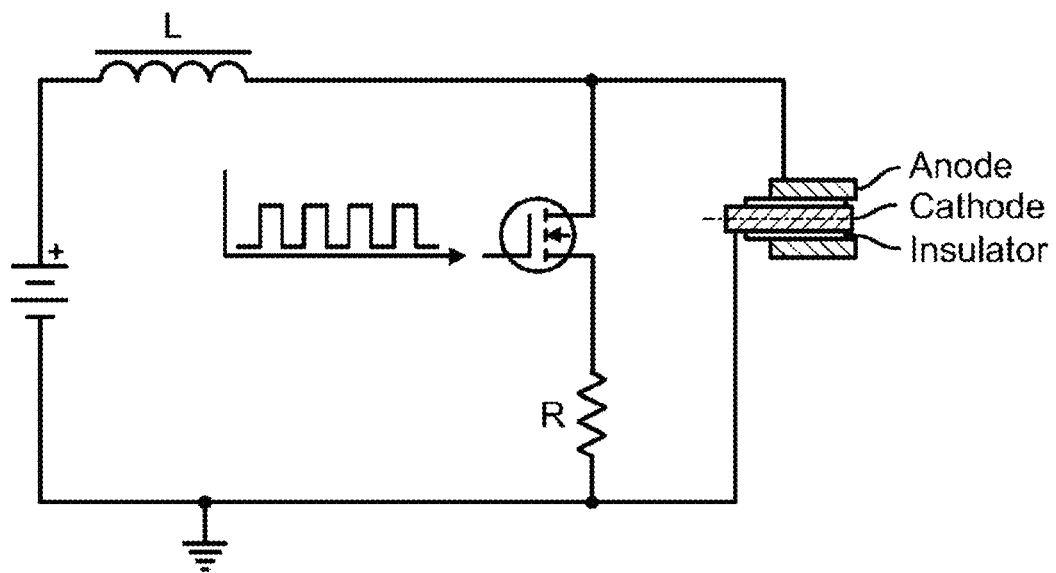
FIG. 3 is a schematic diagram of a conventional vacuum arc thruster, including power source circuitry, used in Comparative Example I.

A PPU and the basic design of the inductive energy storage circuit used in the MCT are shown schematically in FIG. 3. An IGBT transistor was used as the switch for the PPU. The PPU operates in two steps. In the first step, when the switch is open, the inductor used in the circuit was charged by a DC power supply of about 20 V to about 30 V. In the second step, energy accumulated in the inductor was applied to arc electrodes (when the switch is closed). This resulted in a peak voltage of L dI/dt (up to several hundred volts) between electrodes and caused a desired breakdown. Breakdown formed at the insulator ring surface covered with a conductive carbon coating which separated the titanium arc electrodes. Micro-plasmas generated at the insulator ring interface triggered the arc between the electrodes. The current flowing in the inductor was fully switched to the vacuum arc load after IGBT switch opening. Typical arc currents were about 35 A to about 40 A. However, arc currents of about 20 A to about 100 A are also applicable to the present embodiment of the MCT.

The magnet used was an electromagnet having a magnetic coil. The magnetic coil, having a 1020 steel core, was mounted co-axially to the arc electrodes and used to produce a curved magnetic field in the thruster channel (see FIG. 7). The magnetic coil is movable in the axial direction in order to provide the proper configuration for the magnetic field. The magnetic field was generated using a coil current $I_{coil}$=20 A. The magnetic coil included a coil of 0.5 mm diameter copper wire with 700 turns. The magnetic coil was configured to be co-axial with the arc electrode axis, and the magnetic core had a shape of a washer with a thickness of about 2 mm, see FIG. 8. Although an electromagnet was used in this example for experimental purposes, in a commercial product, a permanent magnet with a lower mass is preferred.

To measure the rotational velocity of the cathode spot a 4-probe assembly was used. Four single probes were located along the azimuth inside the thruster channel. The probes were covered with insulating heat shrink tubes along their length except a small part (about 1 mm) facing the external cathode-insulator interface. The probes were biased about −30 V with respect to the grounded cathode.

The total ion current in the MCT assembly output was collected to the negatively biased walls of the vacuum chamber, in which the MCT assembly 18 was located to simulate the vacuum of space, (−40 V with respect to the grounded cathode) and measured using a 50Ω shunt resistor. Arc current was measured using a 0.1Ω shunt resistor.

Experimental Results

Figure 4:
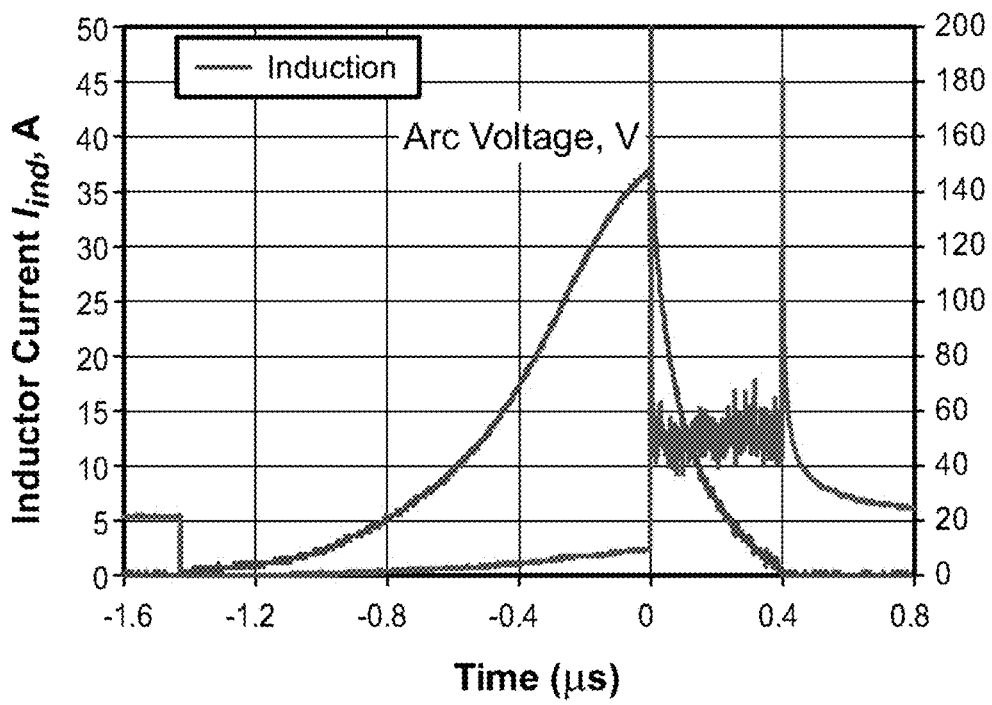
FIG. 4 is a graph of the current passing through the inductor versus the measured voltage between the anode and the cathode of the MCT of Example I.

FIG. 4 shows the waveforms of voltage U between arc electrodes and current in inductor $L_{ind}$. Energy accumulated in the inductor is from −1.5 ms to 0 and $I_{ind}$ reached about 40 A prior to breakdown. Breakdown occurs at t=0 by closing the IGBT switch which causes a voltage peak of several hundred volts applied to the arc electrodes observed at t=0. Note, for t<0 (when the switch is open), $I_{ind}$ is equal to current flowing through the switch, while for t>0, $I_{ind}=I_{arc}$ and $U=U_{arc}$, where $I_{arc}$ and $U_{arc}$ are arc current and arc voltage respectively. Typical arc voltage was about 50 V, arc current decreased from 35-40 A to 0 and arc duration was several hundred microseconds. An overall schematic of the thruster and plume is shown in FIG. 8.

Figure 5:
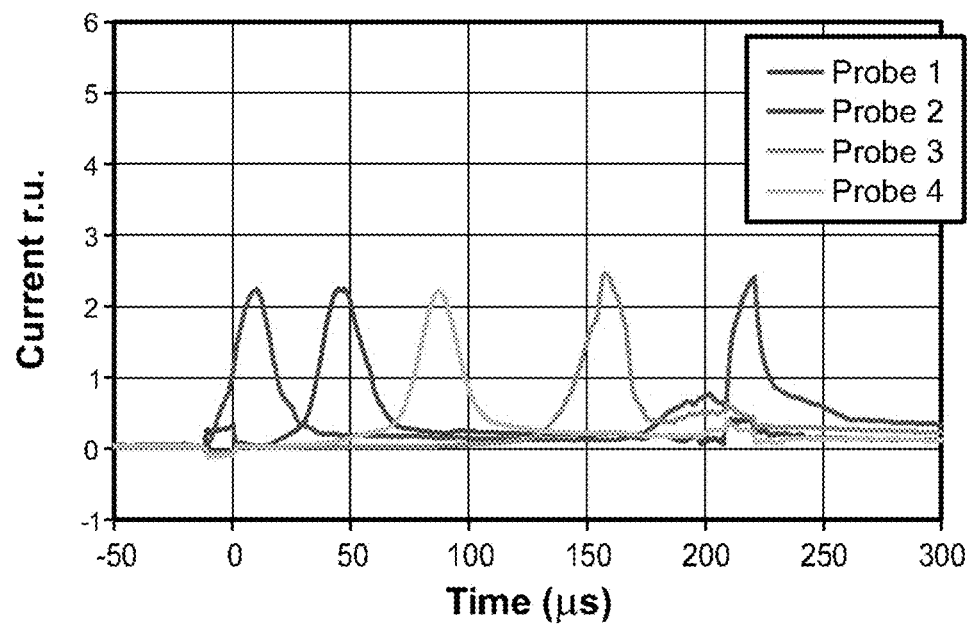
FIG. 5 is a graph of the time-cathode jet current distribution of the MCT of Example I illustrating a complete rotation of a cathode spot along an external cathode-insulator interface.

Typical signals obtained from the 4-probe assembly are shown in FIG. 5. It was observed that the arc was rotated in the −JxB direction and rotational velocity slightly decreased with arcing time. An average rotational velocity was about 75 m/s. It is seen from FIG. 5 that the cathode spot fully revolved around the inside cathode surface, which is critical for homogeneous cathode erosion and thruster lifetime.

Figure 6:
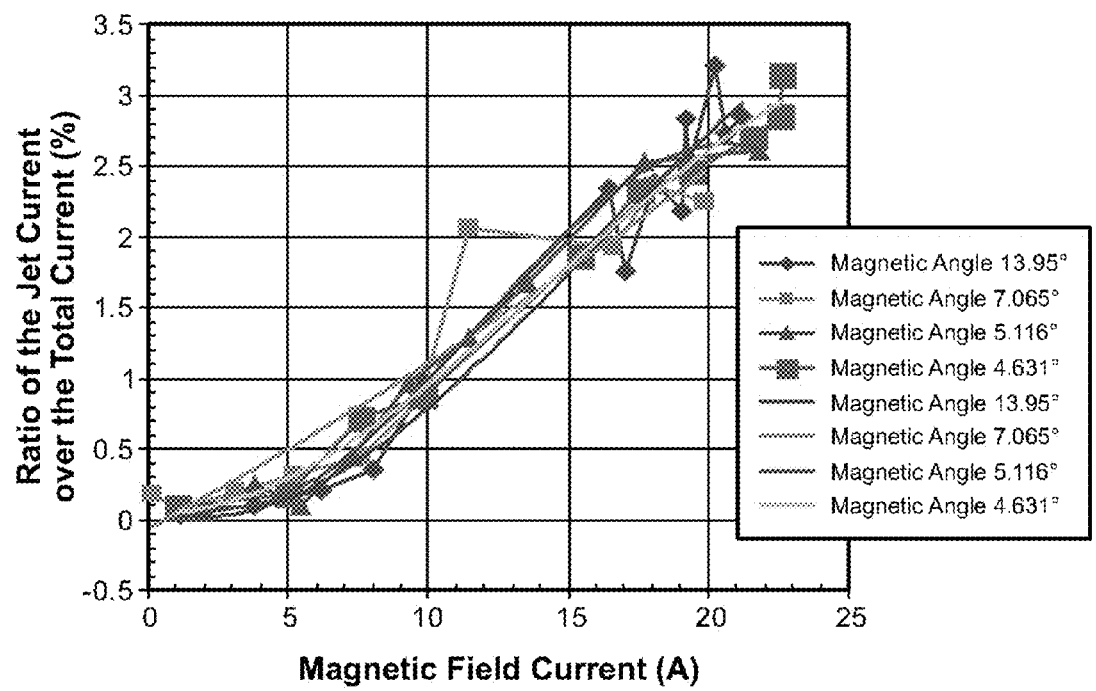
FIG. 6 is a graph of the change of ratio of the jet current over the total arc current versus magnetic field coil current under different magnetic field angles of the MCT of Example I.
Figure 7:
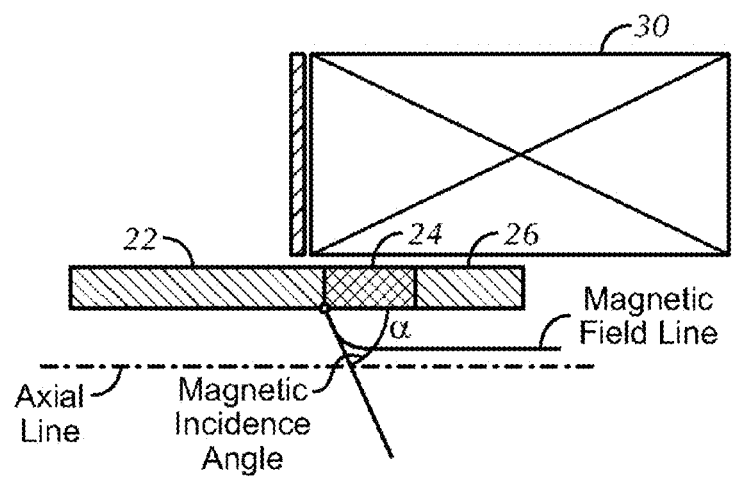
FIG. 7 is a partial cross-sectional elevational view of a portion of the MCT of FIG. 2 illustrating the magnetic angle of the applied magnetic field.

FIG. 6 shows that with increased magnetic field strength, the total current also increases. The geometry of the magnetic field is shown in FIG. 7. The magnetic incidence angle, also referred to herein and in the drawings as the "magnetic angle," is the angle α (as shown in FIG. 7) between the magnetic field line and the direction of the cathode spot at its point of origin. In other words, the magnetic angle α is the angle of the magnetic field lines at or about the external cathode-insulator interface relative to an axis extending distally from the external cathode-insulator interface and parallel to the longitudinal axis of the housing. In this configuration, by adding a properly configured magnetic field, plasma will be guided along the magnetic field lines. That is, the cathodic jet plasma initially formed in a direction transverse to the magnetic field vectors will be redirected by the magnetic field so as to have a magnetic incidence angle that more closely corresponds to the axis of the MCT assembly. This transport phenomenon by the magnetic field results in a higher velocity of plasma plume.

Figure 9:
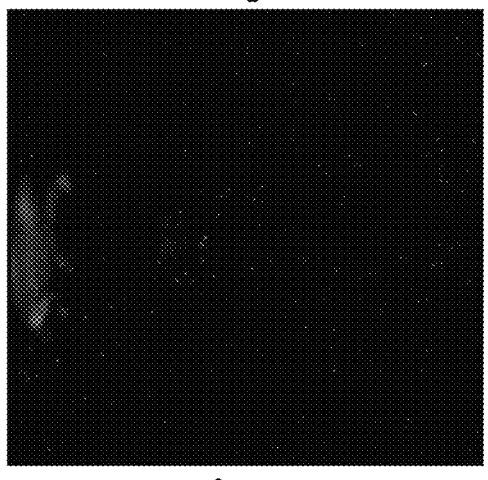
FIG. 9 is a photo of a plasma plume of the MCT used in Example I without a magnetic field applied.
Figure 9A:
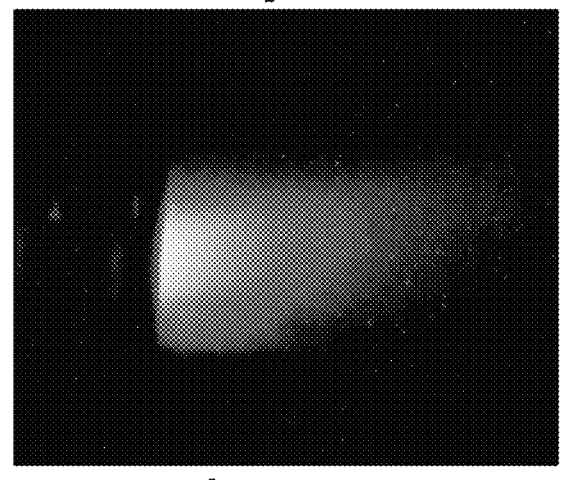
FIG. 9A is a photo of a plasma plume of the MCT used in Example I with a magnetic field applied.
Figure 10:
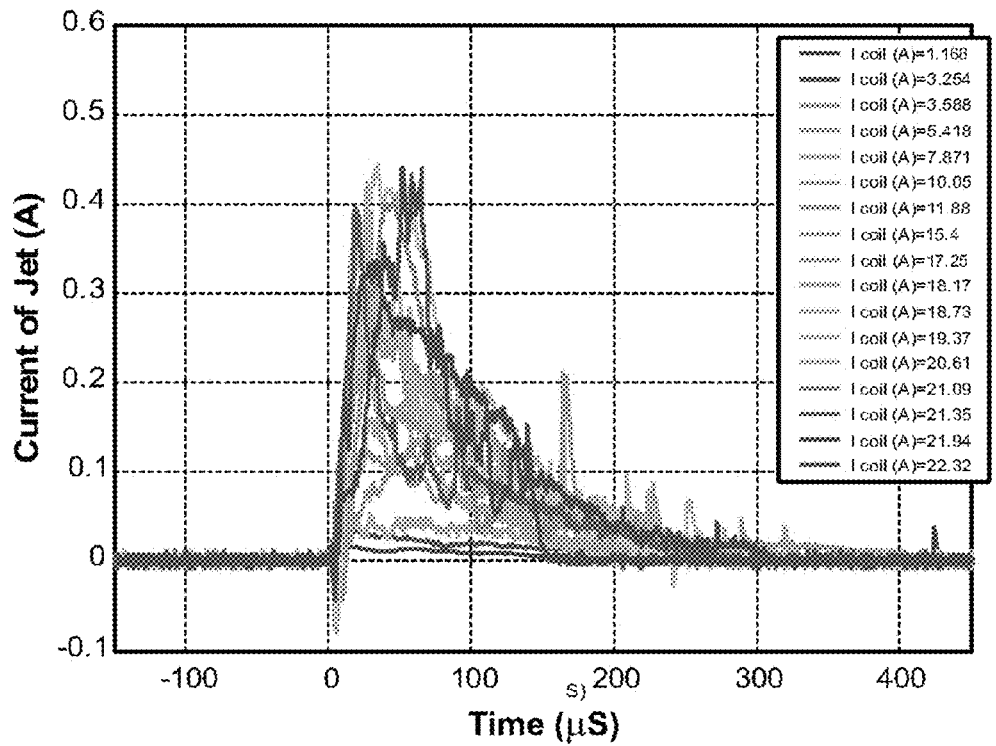
FIG. 10 is a graph of the time-jet current distribution of the MCT used in Example I with different magnetic field coil currents of an electromagnet used in the MCT.

FIGS. 9 and 10 illustrate the effect of the magnetic field on thruster output of the MCT. FIG. 9 is a photograph of the plasma plume without a magnetic field applied to the MCT, while FIG. 9A is a photograph of the plasma plume with a magnetic field applied to the MCT. It is seen that a strong plasma plume having the length of about 7 cm was observed with magnetic field applied beyond the exit plane in contrast with almost no plasma plume without an applied magnetic field. FIG. 10 illustrates the temporal evolution of output jet current $I_{jet}$ for different currents in the magnetic coil of the magnet. It is seen that applying the magnetic field at the appropriate position beyond the MCT assembly's exit plane results in a significant increase of $I_{jet}$.

Figure 11:
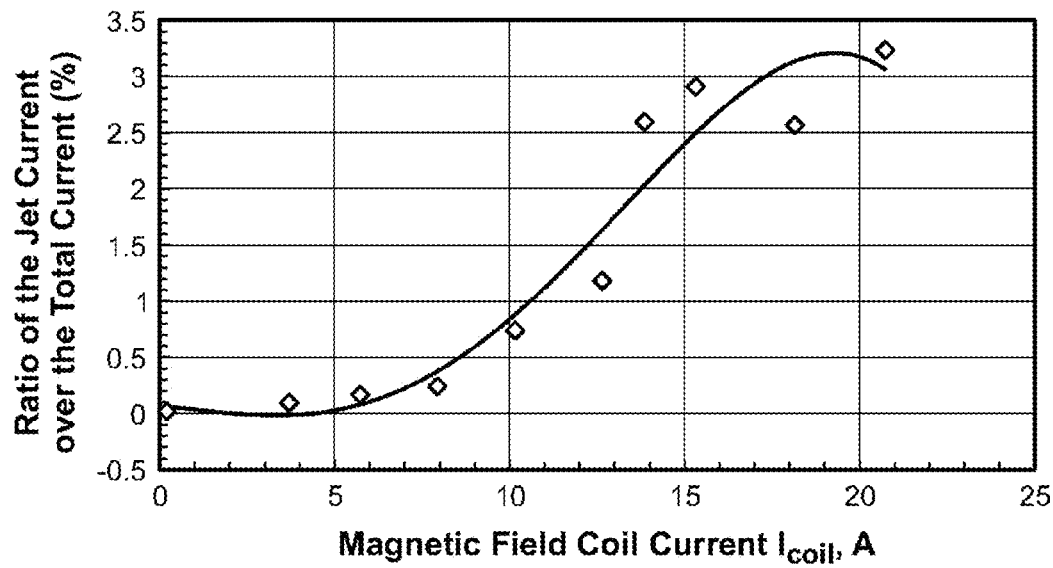
FIG. 11 is a plot of the experimental results of the change of ratio of the jet current over the total arc current with change of magnetic field coil current of the MCT used in Example I.

FIG. 11 shows the dependence of ratio $$f = \frac{I_{jet}}{I_{arc}} \times 100\%$$

on the coil current $I_{coil}$. It was observed that without the magnetic field the thruster output was low: f=0.06%. Increase of the magnetic field to 0.3 T, which is the magnetic field strength at the edge of the cathode 22 and the insulator 24 resulted in significant output increase (up to 50 times), which finally saturated at f ~3-3.5%. Note that f cannot exceed the $$f_{max} = \frac{I_{max}}{I_{arc}} \times 100\%,$$

where $I_{max}$ is the total jet current generated from the cathodic spot. The $f_{max}$ for titanium is about 8%. Thus f ~3-3.5% observed corresponds to about 45% efficiency of the cathodic jet transport through the thruster channel.

Figure 12:
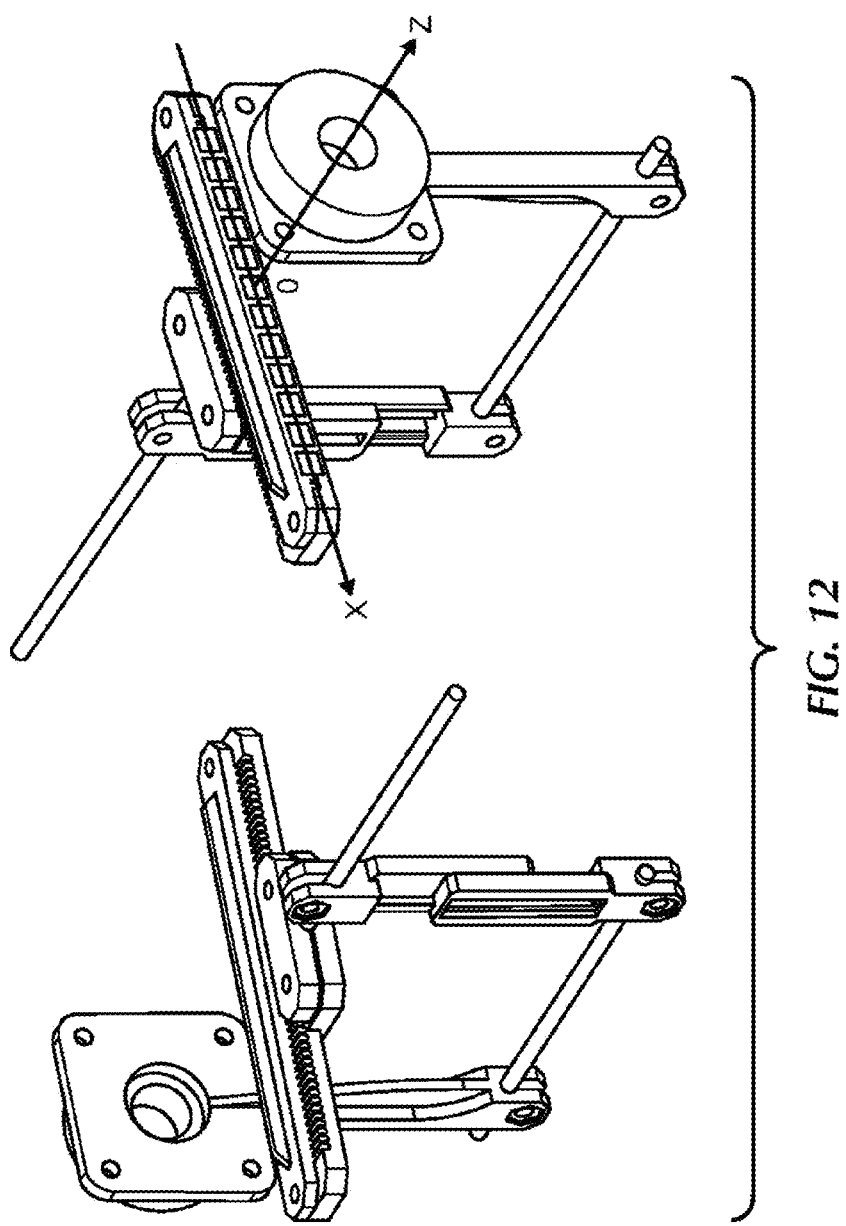
FIG. 12 is an isometric view of a twelve probe assembly used to measure the distribution of ion current outside the thruster channel of the MCT used in Example I.

Distribution of ion current outside of the thruster channel of the MCT assembly was measured using an assembly of twelve (12) probes, as shown in FIG. 12. The twelve probes separated 1 cm apart from each other were installed on an adjustable holder.

Figure 13B:
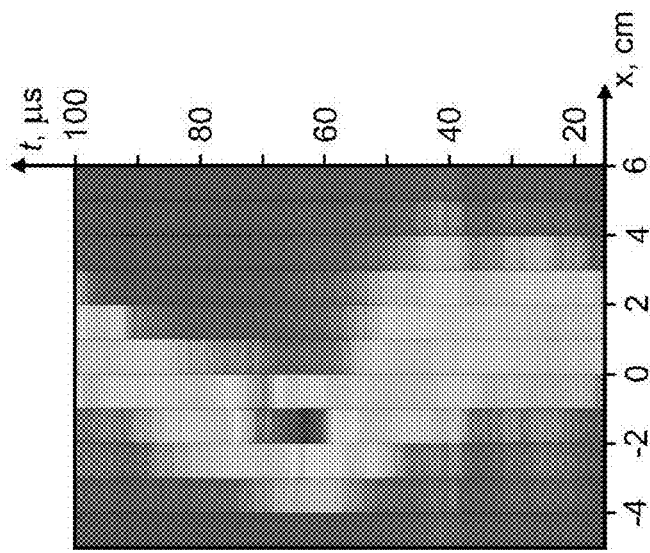
FIGS. 13A and 13B are temporal evolution plots of the ion current radial distribution measured at 7.6 cm exiting the MCT of Example I at its discharge end.
Figure 13A:
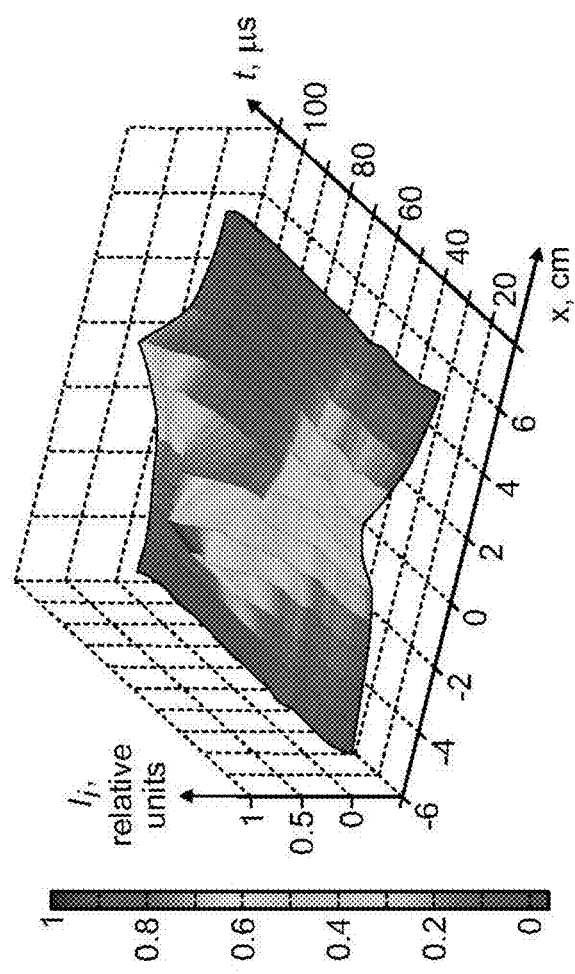

FIGS. 13A and 13B show the distributions of ion current at different moments of time during a single pulse. At t=20 μs as after arc initiation, the ion current peak is shifted about 1.5 cm from the MCT assembly's axis. Simulations of the thruster coil magnetic field indicates that a magnetic field line passing through this point (x=1.5 cm, z=7.6 cm) is originated from the cathode-insulator edge. This indicates that the plasma produced in the cathode spot at the external cathode-insulator interface is guided along the magnetic field line. This is further indicated in the temporal evolution of ion current peak, as shown in FIGS. 13A and 13B, where the ion current peak appears first at x=1.5 cm (at t=20 μs), then shifts to x=−1.5 cm (at t=65 μs) and finally returns back to x=1.5 cm at t=100 μs. This indicates that the plasma jet, guided along the magnetic field, is rotating. Plasma jet rotation follows the rotation of the cathode spot, which is presented in FIG. 5.

In sum, the MCT assembly 18 resulted in the ratio of jet current to magnetic field coil current, as shown in FIG. 11. In particular, the ratio of jet current from a magnetic field of 0 to 20 A increased from about 0.05 to about 3.0, thus representing an over 50× increase in ion output current. FIG. 11 is analogous to the Comparative Example I data shown in FIG. 16, which shows about a 1.3× increase in performance. Thus, the MCT of the instant invention provides a surprisingly significant increase in performance over conventional VATs.

In accordance with another embodiment, the present invention provides for an alternative form of MCT 100, as partially shown in FIG. 14. The MCT 100 can be configured with a PPU including a voltage source, an energy storage inductor, and a switch, as described above for MCT 10 and therefore, a detailed description of such components will not be repeated in detail with respect to MCT 100. The main difference between the MCT 10 and MCT 100 is in the configuration of the MCT assembly 118 for MCT 100.

As shown in FIG. 14, the MCT assembly 118 includes a body in the form of a tubular housing 120, a tubular cathode 122, a tubular insulator 124, an anode 126, a biasing member 128, and a magnet 130 providing a magnetic field. Each of the components of the MCT assembly 118 can be formed from materials or configured as described above for the MCT 10 embodiment.

The housing 120 is a tubular housing preferably formed of an insulating material and configured to house each of the tubular cathode 122, tubular insulator 124, anode 126, and biasing member 128. Specifically, the insulator is housed concentrically within the cathode and the anode is housed concentrically within the insulator. The term "concentrically" as used herein refers to having a common center regardless of the shapes sharing the common center. Moreover, the cathode and insulator are housed within the housing such that the cathode is slidable relative to the insulator and the inside surface of the housing.

The housing 120 also includes a radially inwardly extending flange 134 which can be formed integrally and unitarily with the housing 120. The flange 134 is configured to engage a distal end of the cathode 122 to prevent distal movement of the cathode 122 beyond the discharge or distal end 120b of the housing 120. A base 132 is connected to or may be unitarily formed with a proximal end 120a of the housing 120 to encase or cap the proximal end 120a. Preferably, the base includes an opening 132a for receiving and connecting to a proximal end of the anode 126.

The cathode 122 is a tubular cathode having an inner diameter $ID_c$ about 60% to about 95% of the cathode's outside diameter $OD_c$. Preferably, the cathode 122 has a wall thickness of about 0.1 mm to about 1.0 mm. The outside diameter $OD_c$ is configured to be smaller than the inside diameter $ID_h$ of the housing 120, such that the cathode 122 is slidable within and along the length of the housing 120. The inside diameter $ID_c$ of the cathode 122 is configured to receive the insulator 124 and anode 126. The cathode 122 includes an open proximal end 122a and an open distal end 122b. The distal end 122b engages the radially inwardly extending flange 132 of the housing 120 so as to arrest further movement distally. The proximal end 122*a* is configured to engage a distal end 128*b* of the biasing member 128.

The biasing member 128 is preferably configured as a compression spring 128, as shown in FIG. 14. The spring 128 includes a proximal end 128*a* and a distal end 128*b*. The spring's proximal end 128*a* engages the base 132 while the distal end 128*b* engages the cathode 122, such that the spring 128 continuously transmits a distally directed biasing force to move the cathode 122 distally towards the exit plane (i.e., the discharge or distal end 120*b* of the MCT assembly 118).

The insulator 124 is configured as a tubular insulator 124 having a proximal end 124*a* and a distal end 124*b* and an inner diameter $ID_i$ about 60% to 95% of the insulator's outside diameter $OD_i$. More preferably, the insulator 124 has a wall thickness of about 1 mm to about 2 mm. The insulator 124 preferably has an overall outside diameter $OD_i$ of about 3 mm to about 7 mm and is configured to slidingly engage the cathode 122, such that the cathode 122 is slidable along the length of the insulator 124 adjacent the outside of the insulator 124. The insulator 124 also includes an inside diameter $ID_i$ that is configured to receive the anode 126, such that the insulator 124 resides substantially between the cathode 122 and the anode 126. However, the distal end 124*b* of the insulator 124 is configured to be fixed in position slightly proximal to the distal end of the cathode 122 and anode 126. Preferably, the insulator 124 is spaced proximally about 1 mm to about 7 mm from the distal ends of the cathode 122 and anode 126. The spacing of the insulator 124 from the distal end of the cathode 122 and anode 126 allows for arc generation between the cathode 122 and anode 126. The insulator 124 also includes a non-polished, surface roughness to facilitate adhesion of a conductive thin film coating 123 that is similar to conductive thin film coating 23. The conductive thin film coating 123 can be positioned between the insulator 124 and the cathode 122 or along the distal face of the insulator 124.

The anode 126 can be configured as a cylindrical or tubular anode and housed within the insulator 124. The anode 126 includes a proximal end 126*a* and a distal end 126*b*. The anode 126 also includes a distal face 126*c* configured to be substantially inline with a distal face 122*c* of the cathode 122. That is, the distal faces 122*c* and 126*c* are substantially within the same plane that defines the exit plane of the MCT assembly 118. As will be further described below, the distal end 122*b* of the cathode 122 is eroded during use, however, the spring 128 will continuously urge the cathode 122 distally such that the distal end 122*b* will remain substantially within the exit plane region/external cathode-insulator interface and flush with and/or beyond the distal end 124*b* of the insulator 124.

The anode 126 and insulator 124 are fixed in position within the housing 120, as shown in FIGS. 14 and 15. Preferably, the distal end of the cathode is positioned adjacent a distal end of the insulator. Thus, distally facing ends of the cathode and insulator form an external cathode-insulator interface, i.e., a point of origin of the plasma plume.

As shown in FIG. 14, the MCT assembly 118 can alternatively include an abutment 121, such as in the form of an annular ring 121 attached to a distal face of the housing 20 that forms the radially inwardly extending flange portion 134. Thus, the annular ring serves as an abutment proximate the open distal end of the housing. The annular ring 121 engages the distal end of the cathode 122 to stop or arrest the cathode 122 from further movement distally pass the open distal end of the MCT assembly 118. Alternatively, as shown in FIG. 15, an annular ring 121' can be attached to an inner surface of the distal end of the housing 120 to form a radially inwardly extending flange portion 134'.

The magnet 130 can be any magnet or device capable of producing a magnetic field, similar to magnet 30. The magnet 130 is positioned about the distal end of the MCT assembly 118 about the exit plane i.e., the external cathode-insulator interface, such that a portion of the magnet's magnetic field at the external cathode-insulator interface is at an incidence angle of about 0 to about 90 degrees, preferably about 4 to about 30 degrees and more preferably about 30 degrees, relative to a distal segment of the plane of the external cathode-insulator interface. In other words, a portion of the magnet's magnetic field is applied to a position distal to and partially surrounding the external cathode-insulator interface. Such a configuration results in a greatly significant increase in the performance of the MCT's thrust capabilities for output ion current, such as in the order of 50× compared to VATs in which the magnetic field at the external cathode-insulator interface is properly angled relative to the external cathode-insulator interface.

With the significant improvement in thruster performance of the present invention, such MCTs have potential applications related to micro and nano satellites, and drag-free satellites. In addition, such MCTs of the present invention can be used in applications related to thin film depositions.

In accordance with yet another preferred embodiment, the present invention provides for a method of enhancing the thrust-to-power ratio of a vacuum arc thruster. The method includes the steps of providing a vacuum arc thruster, such as the MCT 10 described in the above embodiments. For example, the vacuum arc thruster can include a tubular housing having an open distal end, a tubular cathode having a distal end proximate the open distal end of the housing and housed within the housing, and an insulator in contact with the cathode forming an external cathode-insulator interface. The method also includes the step of providing a magnetic field positioned adjacent to, at or about the external cathode-insulator interface and having magnetic field lines angled at an incidence angle of about 0 to about 90 degrees, preferably about 4 to about 30 degrees and more preferably about 30 degrees. The magnetic field can be a provided by a magnet, such as an electromagnet as described in the above embodiments.

In accordance with a further preferred embodiment, the present invention provides for a method of controlling thruster output of a vacuum arc thruster. The method includes the steps described above for the method of enhancing the thrust-to-power ratio of a vacuum arc thruster. Additionally, the method includes the step of providing a controller that controls the magnetic field strength of the magnetic field. The controller can be any controller known in the art and applicable to vacuum arc thrusters, such as, but not limited to a computer, CPU, logic controller and the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A micro-cathode thruster assembly comprising:
  a tubular housing having an open distal end;
  a tubular cathode housed within the housing, the cathode having a distal end positioned proximate the open distal end of the housing;

an insulator in contact with the cathode forming an external cathode-insulator interface;

an anode housed within the housing and proximate the open distal end of the housing;

wherein the insulator is housed concentrically within the cathode, the anode is housed concentrically within the insulator, and the cathode is slidable relative to one of the insulator and the housing, and a magnetic field having magnetic field lines positioned at the external cathode-insulator interface at an incidence angle of about 0 to about 90 degrees relative to the external cathode-insulator interface.

2. The micro-cathode thruster assembly of claim 1, wherein the anode is a tubular anode or a cylindrical anode.

3. The micro-cathode thruster assembly of claim 1, wherein the distal end of the cathode is adjacent a distal end of the insulator, the distal ends of the cathode and insulator forming the external cathode-insulator interface.

4. The micro-cathode thruster assembly of claim 1, wherein the magnetic field has a magnetic field strength of about 0.1 tesla to about 0.3 tesla.

5. The micro-cathode thruster assembly of claim 1, further comprising a biasing member biasing the cathode in a distal direction.

6. The micro-cathode thruster assembly of claim 5, wherein the biasing member is a spring that includes:
a distal end engaged with a proximal end of the cathode; and
a proximal end engaged with a base of the housing.

7. The micro-cathode thruster assembly of claim 1, wherein the cathode has a longitudinal axis and the magnetic field lines are oriented at an incidence angle of about 0 to about 90 degrees relative to the longitudinal axis of the cathode at the external cathode-insulator interface.

8. The micro-cathode thruster assembly of claim 1, wherein the magnetic field lines are oriented at an incidence angle of about 4 to about 30 degrees relative to the external cathode-insulator interface.

9. The micro-cathode thruster assembly of claim 1, wherein the housing includes an abutment proximate the open distal end for arresting movement of the cathode in a distal direction.

10. The micro-cathode thruster assembly of claim 1, wherein the insulator comprises a conductive film forming the external cathode-insulator interface.

11. The micro-cathode thruster assembly of claim 10, wherein the conductive film is a metal or carbon.

12. A micro-cathode thruster comprising:
a power unit that includes:
a voltage source,
an inductor connected to the voltage source, and
a switch connected to the voltage source and the inductor; and
a thruster assembly connected to the power unit, the thruster assembly including:
a tubular housing having an open distal end,
a tubular cathode housed within the housing, the cathode having a distal end positioned proximate the open distal end of the housing, wherein the housing includes an abutment proximate the open distal end for arresting movement of the cathode in a distal direction,
an insulator in contact with the cathode forming an external cathode-insulator interface,
an anode housed within the housing and proximate the open distal end of the housing, and
a magnetic field having magnetic field lines positioned about the external cathode-insulator interface at an incidence angle of about 0 to about 90 degrees relative to the external cathode-insulator interface,
wherein when the power unit supplies power to the thruster assembly, a plasma is produced about the external cathode-insulator interface and directed distally by the magnetic field.

13. The micro-cathode thruster of claim 12, wherein the anode is a tubular anode or a cylindrical anode.

14. The micro-cathode thruster of claim 12, wherein the cathode has a longitudinal axis and the magnetic field has magnetic field lines oriented at an incidence angle of about 0 to about 90 degrees relative to the longitudinal axis of the cathode about the external cathode-insulator interface.

15. The micro-cathode thruster of claim 12, wherein the magnetic field lines are oriented about 4 to about 30 degrees relative to the external cathode-insulator interface.

16. A micro-cathode thruster assembly comprising:
a tubular housing having an open distal end;
a tubular cathode housed within the housing, the cathode having a distal end positioned proximate the open distal end of the housing, wherein the housing includes an abutment proximate the open distal end for arresting movement of the cathode in a distal direction;
an insulator in contact with the cathode forming an external cathode-insulator interface;
an anode housed within the housing and proximate the open distal end of the housing; and
a magnetic field having magnetic field lines positioned at the external cathode-insulator interface at an incidence angle of about 0 to about 90 degrees relative to the external cathode-insulator interface.

17. The micro-cathode thruster assembly of claim 16, wherein the anode is a tubular anode or a cylindrical anode.

18. The micro-cathode thruster assembly of claim 16, wherein the insulator is housed concentrically within the cathode, the anode is housed concentrically within the insulator, and the cathode is slidable relative to one of the insulator and the housing, and wherein the distal end of the cathode is adjacent a distal end of the insulator, the distal ends of the cathode and insulator forming the external cathode-insulator interface.

19. The micro-cathode thruster assembly of claim 16, wherein the magnetic field has a magnetic field strength of about 0.1 tesla to about 0.3 tesla.

20. The micro-cathode thruster assembly of claim 16, further comprising a biasing member biasing the cathode in a distal direction.

21. The micro-cathode thruster assembly of claim 20, wherein the biasing member is a spring that includes:
a distal end engaged with a proximal end of the cathode; and
a proximal end engaged with a base of the housing.

22. The micro-cathode thruster assembly of claim 16, wherein the cathode has a longitudinal axis and the magnetic field lines are oriented at an incidence angle of about 0 to about 90 degrees relative to the longitudinal axis of the cathode at the external cathode-insulator interface.

23. The micro-cathode thruster assembly of claim 16, wherein the magnetic field lines are oriented at an incidence angle of about 4 to about 30 degrees relative to the external cathode-insulator interface.

24. The micro-cathode thruster assembly of claim 1, wherein the insulator comprises a conductive film forming the external cathode-insulator interface.

25. The micro-cathode thruster assembly of claim 24, wherein the conductive film is a metal or carbon.

* * * * *